US008593702B2

(12) United States Patent
Nagasaka

(10) Patent No.: US 8,593,702 B2
(45) Date of Patent: Nov. 26, 2013

(54) IMAGE READER

(75) Inventor: Hideaki Nagasaka, Aichi (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 339 days.

(21) Appl. No.: 12/948,173

(22) Filed: Nov. 17, 2010

(65) Prior Publication Data

US 2011/0211232 A1      Sep. 1, 2011

(30) Foreign Application Priority Data

Feb. 26, 2010   (JP) .................... 2010-042576

(51) Int. Cl.
*H04N 1/04*        (2006.01)
(52) U.S. Cl.
USPC ............ 358/474; 358/496; 358/497; 358/498
(58) Field of Classification Search
USPC ................... 358/474, 496, 497, 498
See application file for complete search history.

(56) References Cited

U.S. PATENT DOCUMENTS

| | | | |
|---|---|---|---|
| 5,136,665 A | 8/1992 | Inoue | |
| 7,019,873 B2 * | 3/2006 | Tohyama et al. | 358/496 |
| 2002/0039207 A1 | 4/2002 | Kanda | |
| 2002/0057472 A1 | 5/2002 | Kono | |
| 2004/0001187 A1 | 1/2004 | Fukusaka | |
| 2005/0134944 A1 | 6/2005 | Chen | |
| 2006/0044620 A1 | 3/2006 | Namikawa | |
| 2007/0120989 A1 | 5/2007 | Minami et al. | |
| 2008/0049269 A1 | 2/2008 | Chen | |
| 2008/0273229 A1 | 11/2008 | Morisawa | |
| 2009/0034001 A1 | 2/2009 | Shiraishi et al. | |
| 2009/0122365 A1 | 5/2009 | Noda et al. | |

FOREIGN PATENT DOCUMENTS

| | | |
|---|---|---|
| CN | 1717021 A | 1/2006 |
| CN | 101299792 A | 11/2008 |
| EP | 1 379 070 A2 | 1/2004 |
| EP | 1 379 070 A3 | 1/2004 |
| EP | 1 903 804 A2 | 3/2008 |
| JP | 5-268424 | 10/1993 |
| JP | 2002-135539 | 5/2002 |
| JP | 2002-218185 | 8/2002 |
| JP | 2003-163766 | 6/2003 |

(Continued)

OTHER PUBLICATIONS

Extended European Search Report dated Mar. 15, 2011 from related European Application No. 10251891.7.

(Continued)

*Primary Examiner* — Houshang Safaipour
(74) *Attorney, Agent, or Firm* — Scully, Scott, Murphy & Presser, P.C.

(57) ABSTRACT

An image reader is provided, which includes a first image reading unit configured to read an image on a first side of a first document sheet being conveyed on a feeding path, and output an analog signal corresponding to the read image of the first side, a second image reading unit configured to read an image on a second side opposite to the first side of the first document sheet being conveyed on the feeding path, and output a digital signal corresponding to the read image of the second side in a differential transmission method, and a processor configured to process the analog signal output from the first reading unit and the digital signal output from the second image reading unit.

7 Claims, 4 Drawing Sheets

(56) References Cited

FOREIGN PATENT DOCUMENTS

| JP | 2004-40311 | | 2/2004 |
| --- | --- | --- | --- |
| JP | 2004-180026 | * | 6/2004 |
| JP | 2005-295204 | | 10/2005 |
| JP | 2006-67441 | | 3/2006 |
| JP | 2006-067441 | * | 3/2006 |
| JP | 2007-82033 | | 3/2007 |
| JP | 2007-150560 | | 6/2007 |
| JP | 2009-124633 | | 6/2009 |

OTHER PUBLICATIONS

Notification of Reasons for Rejection dated Jan. 24, 2012 received from the Japanese Patent Office from related Japanese Application No. 2010-042575, together with an English-language translation.

Japanese Decision of Rejection dated Apr. 24, 2012 from related Japanese Application No. 2010-042575 and U.S. Appl. No. 12/949,168, together with an English-language translation.

Extended European Search Report dated Mar. 17, 2011 from EP Application 10251892.5.

Office Action dated Jan. 25, 2013 from related U.S. Appl. No. 12/949,168.

Chinese Official Action dated Mar. 26, 2013 received in related application CN 201110049836.7.

Chinese Office Action dated Apr. 7, 2013 received in related application CN 201110049871.9.

Chinese Official Action dated Aug. 14, 2013 received in related application CN 201110049836.7.

* cited by examiner

IMAGE READER

CROSS-REFERENCE TO RELATED APPLICATION

This application claims priority under 35 U.S.C. §119 from Japanese Patent Application No. 2010-042576 filed on Feb. 26, 2010. The entire subject matter of the application is incorporated herein by reference.

BACKGROUND

1. Technical Field

The following description relates to one or more image readers configured to read an image of a document sheet, particularly to one or more image readers having a first image reading unit configured to read an image on a first side of a document sheet being conveyed along a feeding path and a second image reading unit configured to read an image on a second side of the document sheet being conveyed along a feeding path.

2. Related Art

So far, an image reader configured to read an image of a document sheet has been applied to various devices such as an image scanner, a copy machine, and a facsimile machine. To attain a function of the image reader of this kind to read images on both sides of a document sheet, an image reader has been proposed that has a single image reading unit configured to read the images on the both sides of the document sheet by reversing the document sheet on an improved feeding path. In addition, recently, an image reader has been proposed that is configured to read images on both sides of a document sheet together using two image reading units. For example, in an image reader having a first image reading unit configured to read an image on a first side of a document sheet being conveyed along a feeding path and a second image reading unit configured to read an image on a second side of the document sheet being conveyed along the feeding path, it is possible to perform, in parallel, an operation of reading the image on the first side using the first image reading unit and an operation of reading the image on the second side using the second image reading unit. Thus, it is possible to enhance a reading speed for reading the both sides of the document sheet.

SUMMARY

However, when the two image reading units are used, and a single processor processes respective signals output from the two image reading units, it might result in a so-called crosstalk due to interference between the signals.

Aspects of the present invention are advantageous to provide one or more improved techniques for an image reader having a first image reading unit configured to read an image on a first side of a document sheet being conveyed along a feeding path and a second image reading unit configured to read an image on a second side of the document sheet being conveyed along the feeding path, which techniques make it possible to reduce a level of crosstalk between respective signals transmitted by the first and second image reading units to a processor.

According to aspects of the present invention, an image reader is provided, which includes a first image reading unit configured to read an image on a first side of a first document sheet being conveyed on a feeding path, and output an analog signal corresponding to the read image of the first side, a second image reading unit configured to read an image on a second side opposite to the first side of the first document sheet being conveyed on the feeding path, and output a digital signal corresponding to the read image of the second side in a differential transmission method, and a processor configured to process the analog signal output from the first reading unit and the digital signal output from the second image reading unit.

BRIEF DESCRIPTION OF THE ACCOMPANYING DRAWINGS

Figure 4A:
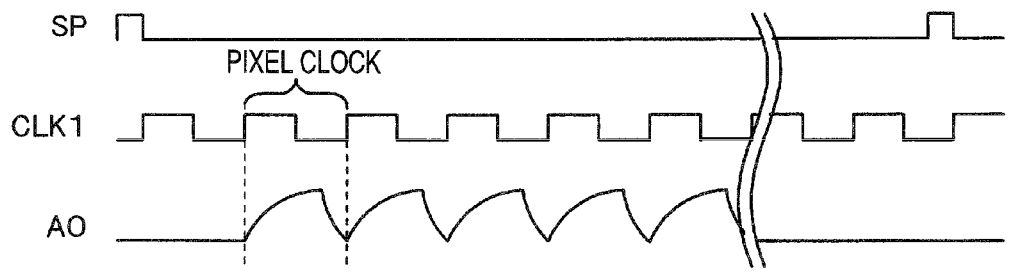
Figure 4B:
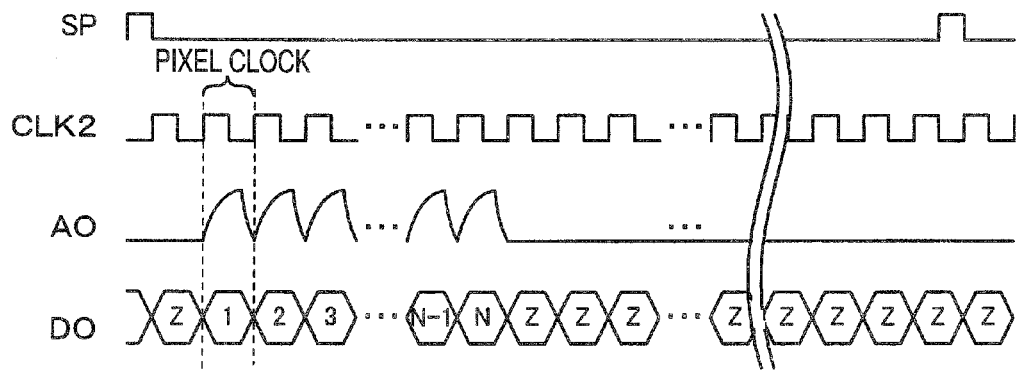
Figure 4C:
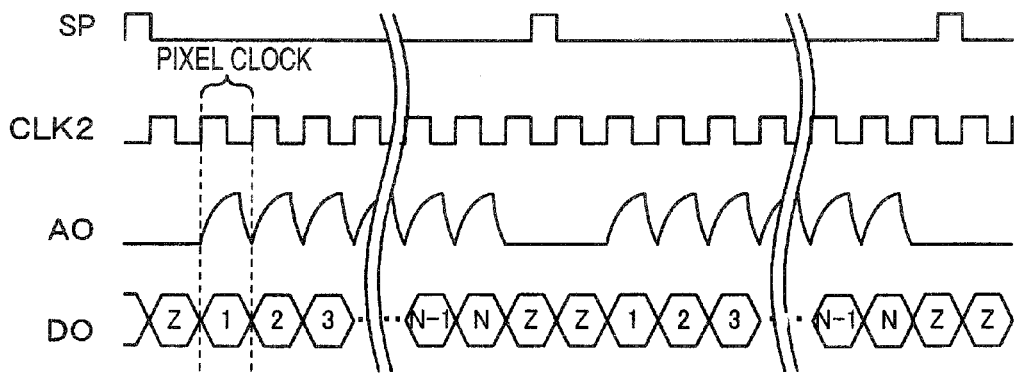

FIGS. 4A, 4B, and 4C exemplify signals transmitted in the image reader in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
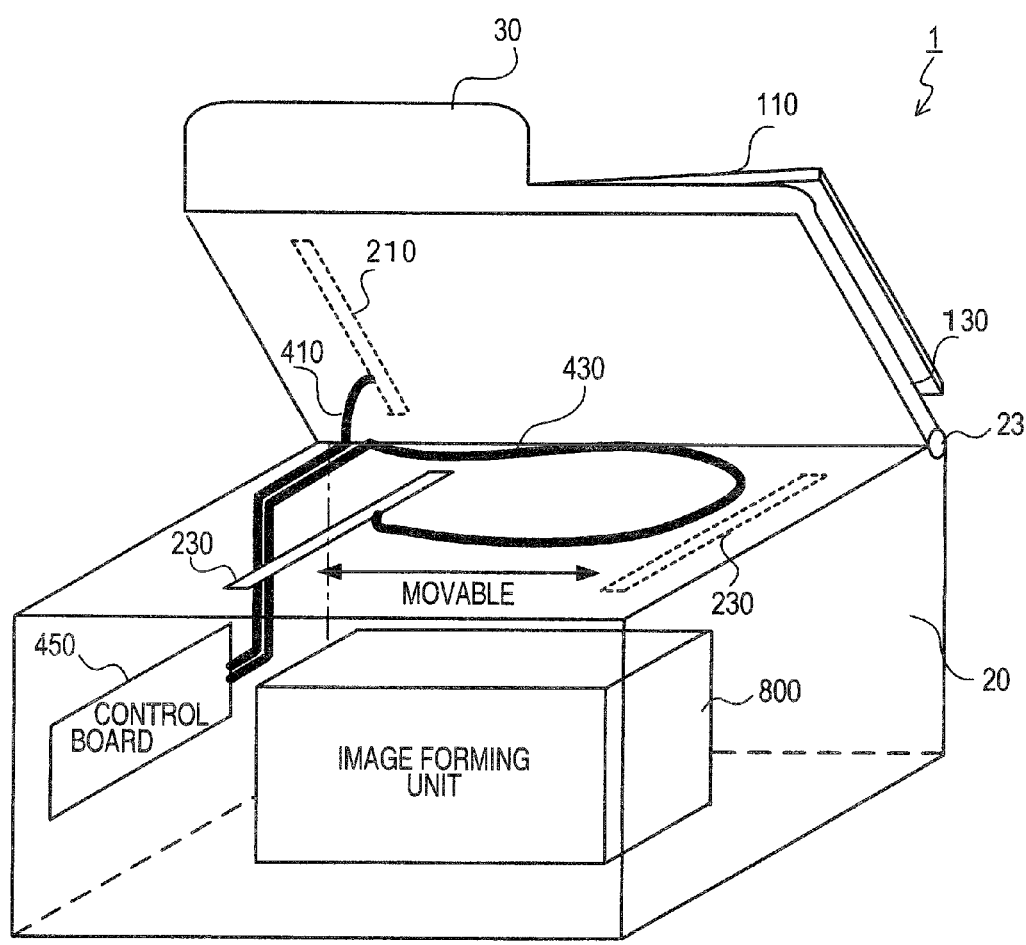
FIG. 1 is a perspective view schematically showing a configuration of a multi-function peripheral (MFP) in an embodiment according to one or more aspects of the present invention.

Hereinafter, an embodiment according to aspects of the present invention will be described with reference to the accompany drawings. As shown in FIG. 1, a multi-function peripheral (MFP) 1 includes a base body 20 and a document cover 30 provided above the base body 20 in an openable and closable manner.

[Overall Configuration of Image Reader]

Figure 2:
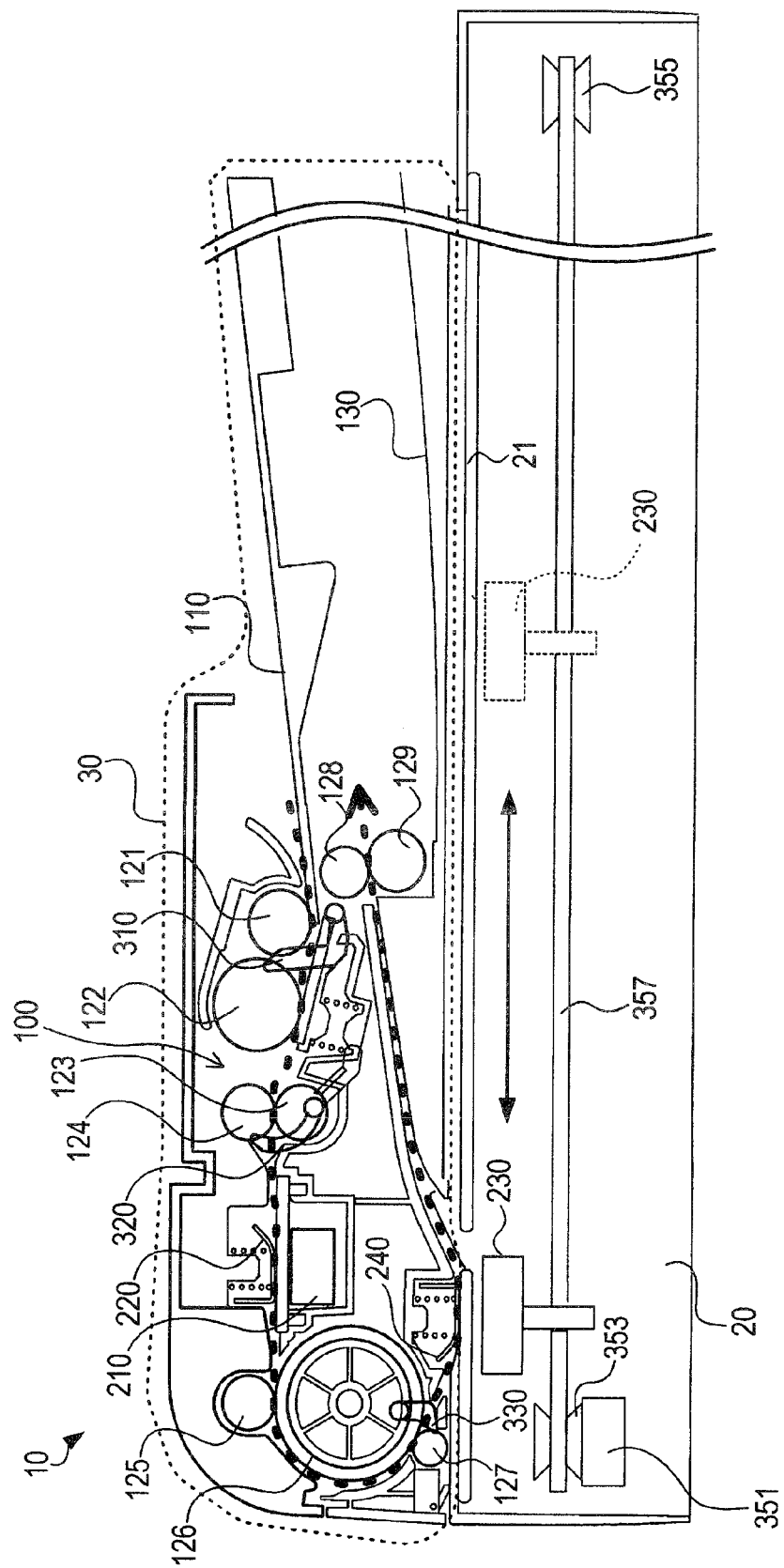
FIG. 2 is a cross-sectional view schematically showing a configuration of an image reader of the MFP in the embodiment according to one or more aspects of the present invention.

As illustrated in FIG. 2, the MFP 1 further includes a glass document table 21 provided on an upper end face of the base body 20. The document table 21 is configured such that a document sheet (not shown) is placed thereon when an image reader 10 of the embodiment is used as a flatbed scanner. The document cover 30 is attached, in an openable and closable manner, to a side (hereinafter referred to as a rear side) of the upper end face of the base body 20 via a hinge 23 (see FIG. 1). Further, the document cover 30 is configured to, when closed, cover the document sheet placed on the document table 21.

Further, as shown in FIG. 2, the document cover 30 is provided with an automatic document feeder (ADF). Specifically, the document cover 30 includes a feeding unit 100 that serves as the ADF to feed the document sheet placed on a feed tray 110 along a feeding path, and a first reading device 210 that is one of two reading devices 210 and 230 configured to read in parallel both a first side and a second side of the document sheet being conveyed on a feeding path. It is noted that the other one of the two reading devices 210 and 230, i.e., the second reading device 230 is provided in the base body 20.

The feeding unit 100 includes feed rollers 121 to 129 configured to feed the document sheet placed on the feed tray 110 to a catch tray 130 along the feeding path (see a thick dashed line in FIG. 2). Additionally, on the feeding path, there are provided an upstream reading position and a downstream reading position. In this case, the first reading device 210 for reading an image on the first side of the document sheet is disposed in a location corresponding to the upstream reading position. It is noted that the first side denotes a down-facing side of the document sheet in the state placed on the feed tray 110. Further, a first pressing member 220 is disposed on the feeding path to press the document sheet passing through the upstream reading position against a reading surface of the first reading device 210. In addition, the second reading device 230 for reading an image on the second side (opposite to the first side) of the document sheet is movably provided in a location, beneath the document table 21, which corresponds to the downstream reading position. Furthermore, a second pressing member 240 is disposed on the feeding path to press the document sheet passing through the downstream reading position against a reading surface of the second reading device 230.

Further, on the feeding path, an F sensor 310, an RB sensor 320, and an R sensor 330 are disposed as sensors to detect presence/absence of the document sheet being conveyed on respective detection positions. The second reading device 230 is fixed to an endless belt 357 wound around a pair of a driving pulley 353 driven by a motor 351 to rotate and a driven pulley 355. Thereby, the second reading device 230 is configured to, in response to rotation of the motor 351, move in an auxiliary scanning direction (i.e., a left-to-right direction in FIG. 2) under the document table 21.

As depicted in FIG. 1, the first reading device 210 and the second reading device 230 are connected with a control board 450 disposed inside the base body 20, respectively via a first harness 410 and a second harness 430 each of which is configured with a flexible flat cable (FFC). As schematically shown in FIG. 1, the second harness 430 has such a sufficient length as to allow the second reading device 230 to move over a whole area in the auxiliary scanning direction under the document table 21 (see FIG. 2). Further, the second harness 430 is provided to join the first harness 410 near the hinge 23 and extend toward the control board 450. The base body 20 includes therein an image forming unit 800 configured to form an image on a sheet based on an electrophotographic technique.

[Configuration of Control System of Image Reader]

Figure 3:
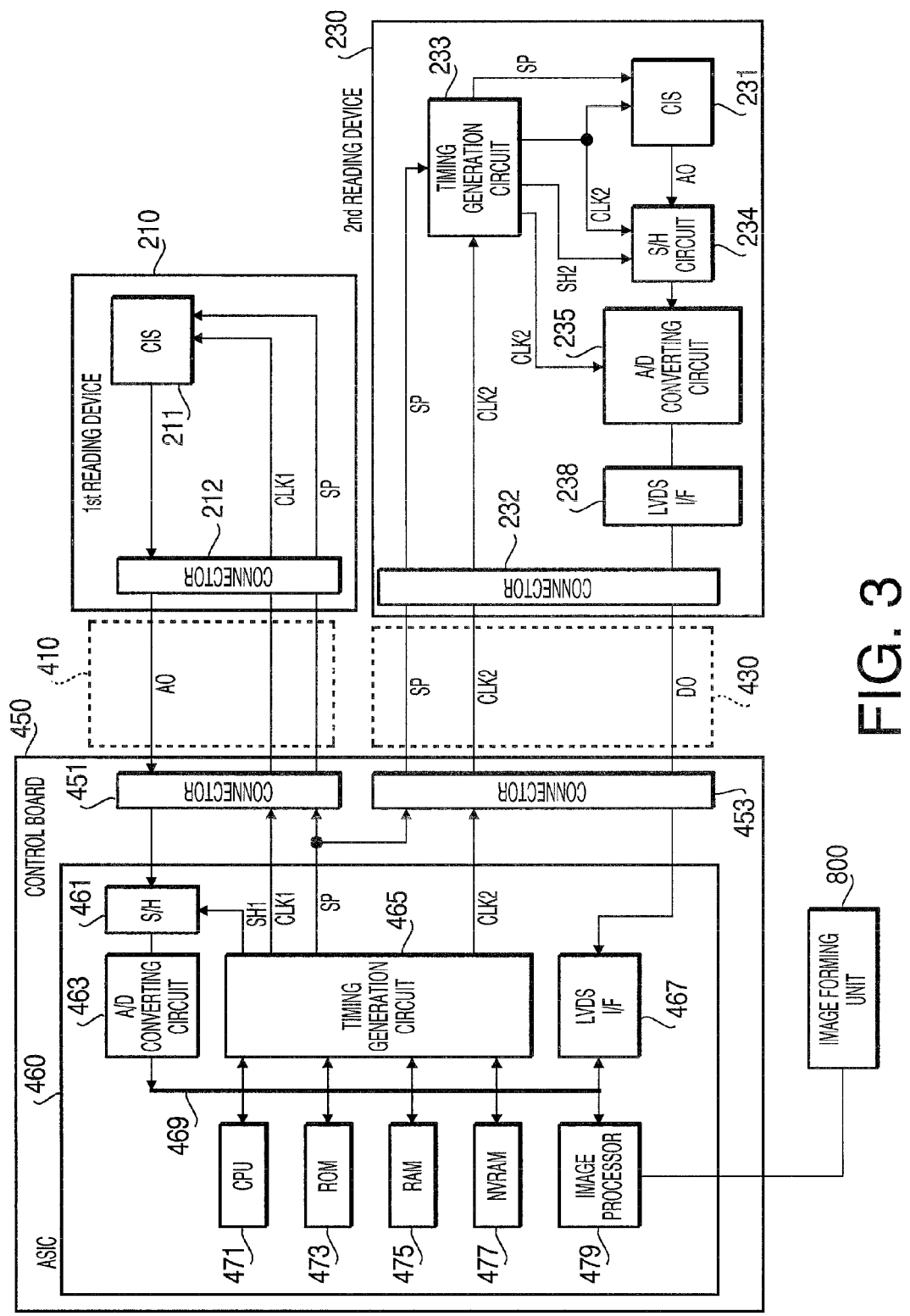
FIG. 3 is a block diagram showing a configuration of a control system of the image reader in the embodiment according to one or more aspects of the present invention.

FIG. 3 is a block diagram showing a configuration of a control system of the image reader 10. As shown in FIG. 3, the first reading device 210 includes a contact image sensor (CIS) 211 configured to, in response to receipt of a start signal SP, output an analog signal AO corresponding to a line of image in a main scanning direction (i.e., a direction perpendicular to plane of FIG. 2) on a pixel-by-pixel basis in synchronization with a rectangular-pulse-shaped clock signal CLK1. The start signal SP and the clock signal CLK1 are transferred from the control board 450 via the first harness 410, and input into the CIS 211 via a connector 212 disposed on an outer surface of the first reading device 210. Further, the analog signal AO output from the CIS 211 is transferred to the control board 450 after passing sequentially through the connector 212 and the first harness 410. It is noted that in FIG. 3, the single block "CIS 211" includes a plurality of elements such as a light source and lenses that form an optical path.

In the same manner as the first reading device 210, the second reading device 230 includes a CIS 231 configured to, in response to receipt of a start signal SP, output an analog signal AO corresponding to a line of image in the main scanning direction on a pixel-by-pixel basis in synchronization with a rectangular-pulse-shaped clock signal CLK2. The start signal SP and the clock signal CLK2 are transferred from the control board 450 via the second harness 430, and input into the CIS 231 after passing sequentially through a connector 232 disposed on an outer surface of the second reading device 230 and a timing generation circuit 233 incorporated inside the second reading device 230.

The timing generation circuit 233 is configured to issue the start signal SP and the clock signal CLK2 into the CIS 231 and also issue the clock signal CLK2 into a sample/hold circuit (S/H circuit) 234 and an A/D converting circuit 235. In addition, the timing generation circuit 233 is configured to issue a below-mentioned sample/hold signal SH2 to the S/H circuit 234. Specifically, the analog signal AO output from each of the CIS 211 and the CIS 231 has a waveform of a wave delayed with a predetermined time constant as exemplified in FIGS. 4A, 4B, and 4C, which waveform results from some causes such as amplification by an amplifier incorporated inside each of the CIS 211 and the CIS 231. The sample/hold signal SH2 is output with a form such as a trigger pulse, at such a moment as to acquire a value around each peak of the waveform of the analog signal AO, which value represents the light intensity of the light received from each pixel in the most adequate manner.

The (analog) value, which the S/H circuit 234 acquires in response to receipt of the sample/hold signal SH2, is converted into a digital value by the A/D converting circuit 235 incorporated in the second reading device 230. Subsequently, the digital value is converted, via an LVDS interface 238, into a digital signal DO to be transmitted in a differential transmission method. Then, the digital signal DO is transferred to the control board 450 via the connector 232 and the second harness 430.

It is noted that three signal lines ("ground," "+," and "−") are required for the differential transmission method, but a single line for transferring the digital signal DO is shown in FIG. 3 for the sake of simple explanation.

The control board 450 includes a connector 451 configured to perform therethrough I/O operations (input/output operations) of transmitting/receiving the aforementioned various signals to/from the first reading device 210 via the first harness, a connector 453 configured to perform therethrough I/O operations of transmitting/receiving the aforementioned various signals to/from the second reading device 230 via the second harness 430, and an ASIC 460 configured to perform various kinds of processing. In the same fashion as the second reading device 230, the ASIC 460 includes a sample/hold circuit (S/H) 461 and an A/D converting circuit 463 that are configured to convert the analog signal AO transferred from the CIS 211 of the first reading device 210 into a digital signal.

In addition, the ASIC 460 includes a timing generation circuit 465 configured to issue the sample/hold signal SH1 to the sample/hold circuit 461 and output the aforementioned clock signals CLK1 and CLK2, start signal SP, and switch signal. The ASIC 460 further includes an LVDS interface (LVDS I/F) 467 configured to convert the digital signal DO transferred from the second reading device 230 in the differential transmission method into a normal digital signal. The timing generation circuit 465 is configured to output, from a single terminal, the same start signal SP to each of the first reading device 210 and the second reading device 230. The start signal SP is divided into two start signals SP outside the ASIC 460, and the two start signals SP are transferred to the first reading device 210 and the second reading device 230 via the connectors 451 and 453, respectively.

The digital signals output from the A/D converting circuit 463 and the LVDS interface 467 are transferred to a bus line 469 connected with a CPU 471, a ROM 473, a RAM 475, an NVRAM 477, and an image processor 479, as well as the aforementioned timing generation circuit 465. Thereby, the ASIC 460 is allowed to perform operations such as deploying the images read by the first reading device 210 and the second reading device 230 in line buffers set on the RAM 475, performing image processing for the images held in the line buffers on the RAM 475 with the image processor 479, and issuing a driving signal to the image forming unit 800.

[Effects of the Embodiment]

In the image reader 10 configured as above in the embodiment, the following signals are transmitted via the first harness 410 and the second harness 430, and it is possible to reduce a level of crosstalk between the signals. FIG. 4A exemplifies a signal transmitted via the first harness 410 in reading the images on the first and second sides of the document sheet. FIG. 4B exemplifies a signal transmitted via the second harness 430 in reading the images on the first and second sides of the document sheet.

As illustrated in FIG. 4A, the start signal SP is transmitted to the first reading device 210 via the first harness 410 at a moment when the first reading device 210 starts reading each line of the image on the first side of the document sheet. In this case, the CIS 211 outputs the wave-shaped analog signal AO on a pixel-by-pixel basis in synchronization with the clock signal CLK1. The analog signal AO is transmitted to the control board 450 via the first harness 410.

Further, as illustrated in FIG. 4B, the start signal SP is transmitted to the second reading device 230 via the second harness 430 at a moment when the second reading device 230 starts reading each line of the image on the second side of the document sheet. In this case, the CIS 231 outputs the wave-shaped analog signal AO on a pixel-by-pixel basis in synchronization with the clock signal CLK2. Then, the S/H circuit 234 acquires an analog value from the analog signal AO in response to receipt of the sample/hold signal SH2. Thereafter, the acquired analog value is converted by the A/D converting circuit 235 into a digital value. The digital value after the conversion is transmitted by the LVDS interface 238 as the digital signal DO to be transmitted in the differential transmission method, to the control board 450 via the second harness 430.

As shown in FIG. 4B, the period of the clock signal CLK2 is half as long as that of the clock signal CLK1. Thus, before one line (the number of pixels per line: N) of the analog signal AO is transmitted via the first harness 410, the digital signal DO for each of the first pixel to the N-th pixel is completely transmitted via the second harness 430. For this reason, after the digital signal for the N-th pixel is output, NUL data (indicated with "Z" in FIG. 4B) is output as the digital signal DO from the LVDS interface 238.

Thus, in the embodiment, the signal transmitted via the first harness 410 is the analog signal AO, while the signal transmitted via the second harness 430 is the digital signal DO that is transmitted in the differential transmission method capable of signal transmission with lowered voltage and noise level. Therefore, in the embodiment, interference is hardly be caused between the signal transmitted via the first harness 410 and the signal transmitted via the second harness 430. It results in a lowered level of crosstalk between the signal transmitted via the first harness 410 and the signal transmitted via the second harness 430. Accordingly, it is possible to perform accurate processes for the images read from the first and second sides of the document sheet.

Further, the second harness 430 has such a length as to allow the second reading device 230 to move over the whole area in the auxiliary scanning direction under the document table 21. Additionally, the second harness 430 is provided to join the first harness 410 near the hinge 23 and extend toward the control board 450. When the second harness 430 has such a long length, the signal transmitted via the second harness 430 is likely to be noisy. Furthermore, when the second harness 430 joins the first harness 410, interference is likely to be caused between the signal transmitted via the first harness 410 and the signal transmitted via the second harness 430. In the embodiment, as described above, the digital signal DO to be transmitted in the differential transmission method is applied as a signal to be transmitted via the second harness 430. Therefore, in the embodiment, it is possible to more efficiently reduce the level of the crosstalk between the signal transmitted via the first harness 410 and the signal transmitted via the second harness 430.

In addition, the first reading device 210 has merely to be provided with the CIS 211 and the connector 212, and thus can be more downsized and lightened in comparison with the second reading device 230. In the embodiment, the first reading device 210 is provided to the document cover 30. Thereby, it is possible to provide a more preferable operability of the document cover 30 in comparison with such a configuration that the second reading device 230 is provided to the document cover 30.

Meanwhile, the second reading device 230 is configured to perform therein signal processing up to A/D conversion. Therefore, the waveform of the analog signal AO output from the CIS 231 is less likely to be deformed while being transferred, and thus it is possible to set the reading speed of the CIS 231 faster. For instance, as is clear from the analog signals AO exemplified in FIGS. 4A and 4B, in the embodiment, the reading speed at which the CIS 231 reads an image of each pixel is set twice as high as that of the CIS 211.

Thus, when a reading operation is performed to read a single side of a document sheet with the second reading device 230 disposed in the downstream reading position, or a reading operation is performed to read only a single side of a document sheet with the second reading device 230 being moved beneath and along the document table 21, the reading operations can be carried out at a high speed as will be mentioned below. Specifically, as exemplified in FIG. 4C, the aforementioned reading operations can be carried out at a speed twice as high as a reading speed in double-side reading, as the start signal SP is issued to instruct the second reading device 230 to read a next line at a moment when the NUL data (the digital signal DO indicated with the character "Z") is output from the second reading device 230 in the case shown in FIG. 4B.

In the MFP 1 of the embodiment, for instance, it is possible to take double-side copy control to, after reading images on both sides of a document sheet, cause the image forming unit 800 to form images corresponding to the read images on both sides of a sheet. In this case, to form the images on the both sides of the sheet takes a time twice as long as a time taken for forming an image on a single side. Hence, even though the time taken for reading the both sides of the document sheet is twice as long as the time taken for reading the single side as mentioned above, it does not affect the efficiency in the double-side copy control.

It is noted that the CPU 471 may be configured to take facsimile transmission control to transmit data of a read image via a modem (not shown) and/or scanning control to store the data of the read image onto a storage device. In other words, the image reader 10 may not necessarily be incorporated into a device having an image forming unit.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

The image reader 10 may have a processor, instead of the control board 450 exemplified in the aforementioned embodiment, which processor is configured to merely perform a simple process such as attaching a time stamp to an analog signal output from the first image reading device 210 and/or a digital signal output from the second reading device 230.

What is claimed is:

1. An image reader comprising:
   a first image reading unit comprising a first sensor configured to read an image on a first side of a first document sheet being conveyed on a feeding path, and output a first analog signal corresponding to the read image of the first side;
   a second image reading unit comprising:
      a second sensor configured to read an image on a second side opposite to the first side of the first document sheet being conveyed on the feeding path, and output a second analog signal corresponding to the read image of the second side;
      an analog-digital converter configured to convert the second analog signal output from the second sensor into a first-order digital signal, and output the first-order digital signal; and
      a differential transmitter configured to convert the first-order digital signal output from the analog-digital converter into a second-order digital signal for differential transmission so as to reduce crosstalk interference with the first analog signal output from the first sensor of the first image reading unit, and output the second-order digital signal in a differential transmission method; and
   a processor configured to process the first analog signal output from the first sensor of the first reading unit and the second-order digital signal output from the differential transmitter of the second image reading unit.

2. The image reader according to claim 1, having an operation mode to read only the image on the second side of the first document sheet being conveyed on the feeding path with the second image reading unit.

3. The image reader according to claim 1,
   wherein the second image reading unit is configured to read an image of each pixel at a reading speed higher than a reading speed of the first image reading unit.

4. The image reader according to claim 2,
   wherein the second image reading unit is configured to read an image of each pixel at a reading speed higher than a reading speed of the first image reading unit.

5. The image reader according to claim 1, further comprising:
   a first harness configured to transmit the first analog signal from the first sensor of the first image reading unit to the processor; and
   a second harness configured to transmit the second-order digital signal from the differential transmitter of the second image reading unit to the processor, the second harness having a length longer than a length of the first harness.

6. The image reader according to claim 1, further comprising:
   a base body;
   a document table fixed to the base body, the document table being configured such that a second document sheet is placed thereon;
   a first harness configured to transmit, to the processor, the first analog signal output from the first image reading unit: and
   a second harness configured to transmit, to the processor, the second-order digital signal output from the second image reading unit,
   wherein the second image reading unit is provided to the base body, and configured to perform any one of:
      a first reading operation to read the image on the second side of the first document sheet being conveyed on the feeding path while statically staying in the base body; and
      a second reading operation to read an image on a single side of the second document sheet placed on the document table while moving in a predetermined direction along the document table, and
   wherein the second harness has a length that allows the second image reading unit to move in the predetermined direction along the document table.

7. The image reader according to claim 6, further comprising a document cover that is attached to the base body in an openable and closable manner and configured to, when closed, cover the second document sheet placed on the document table,
   wherein the first image reading unit is provided to the document cover,
   wherein the processor comprises a converter configured to convert the first analog signal output from the first image reading unit into a digital signal, and
   wherein the second sensor is configured to read one of the image on the second side of the first document sheet being conveyed on the feeding path and the image on the single side of the second document sheet placed on the document table.

* * * * *

UNITED STATES PATENT AND TRADEMARK OFFICE
CERTIFICATE OF CORRECTION

Page 1 of 1

PATENT NO. : 8,593,702 B2
APPLICATION NO. : 12/948173
DATED : November 26, 2013
INVENTOR(S) : Hideaki Nagasaka It is certified that error appears in the above-identified patent and that said Letters Patent is hereby corrected as shown below:

On the Title Page

Item (56) References Cited

It Should Read:

FOREIGN PATENT DOCUMENTS

| | | | |
|---|---|---|---|
| CN | 1717021 | A | 1/2006 |
| CN | 101299792 | A | 11/2008 |
| EP | 1 379 070 | A2 | 1/2004 |
| EP | 1 379 070 | A3 | 6/2005 |
| EP | 1 903 804 | A2 | 3/2008 |
| JP | 5-268424 | | 10/1993 |
| JP | 2002-135539 | | 5/2002 |
| JP | 2002-218185 | | 8/2002 |
| JP | 2003-163766 | | 6/2003 |

Signed and Sealed this
Twenty-ninth Day of April, 2014

Michelle K. Lee
*Deputy Director of the United States Patent and Trademark Office*